H. R. ISLER.
GEAR CUTTER GRINDER.
APPLICATION FILED JAN. 26, 1917.

1,249,631.

Patented Dec. 11, 1917.
2 SHEETS—SHEET 1.

Inventor
Herman R. Isler
by
Evard & Stearman
Attorneys

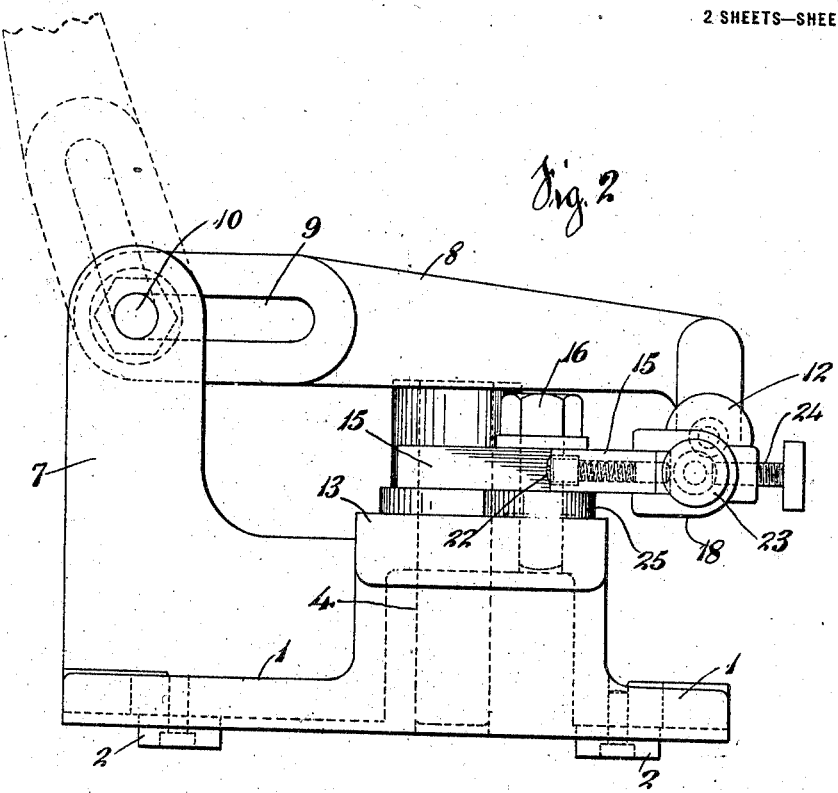
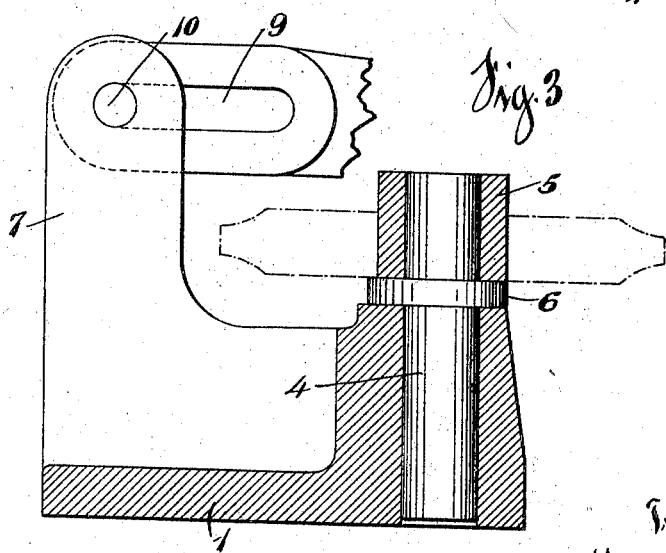

UNITED STATES PATENT OFFICE.

HERMAN R. ISLER, OF NORWOOD, OHIO, ASSIGNOR TO THE OAKLEY MACHINE TOOL COMPANY, OF CINCINNATI, OHIO, A CORPORATION OF OHIO.

GEAR-CUTTER GRINDER.

1,249,631.     Specification of Letters Patent.     Patented Dec. 11, 1917.

Application filed January 26, 1917. Serial No. 144,757.

*To all whom it may concern:*

Be it known that I, HERMAN R. ISLER, a citizen of the United States, and a resident of Norwood, in the county of Hamilton and State of Ohio, have invented certain new and useful Improvements in Gear - Cutter Grinders, of which the following is a full, clear, and exact description, reference being had to the accompanying drawings, forming a part of this specification.

My invention relates to improvements in gear cutter grinders, and particularly to the provision of an attachment whereby gear cutters may be properly sharpened by successive operations of the grinding tool.

It is essential, in order properly to sharpen the teeth of a gear cutter, that the cutting edges of the several teeth when sharpened, shall be equidistant from the center and also that the faces of the teeth shall be in axial planes radially disposed.

One object of my invention is to provide an attachment for a grinding machine of simple, inexpensive and efficient construction whereby the teeth of a gear cutter may be conveniently and expeditiously sharpened in the manner mentioned.

Another object of my invention is to provide a mechanism whereby the minute adjustments for the successive operations of the grinding tool may be conveniently and rapidly performed.

Other objects of my invention will be apparent to those skilled in the art to which the same appertains, from the following description thereof, taken in connection with the accompanying drawings.

In the drawings:

Fig. 2 is a side elevation of said attachment.

Fig. 3 is a sectional view of a portion of said invention.

Figure 1:
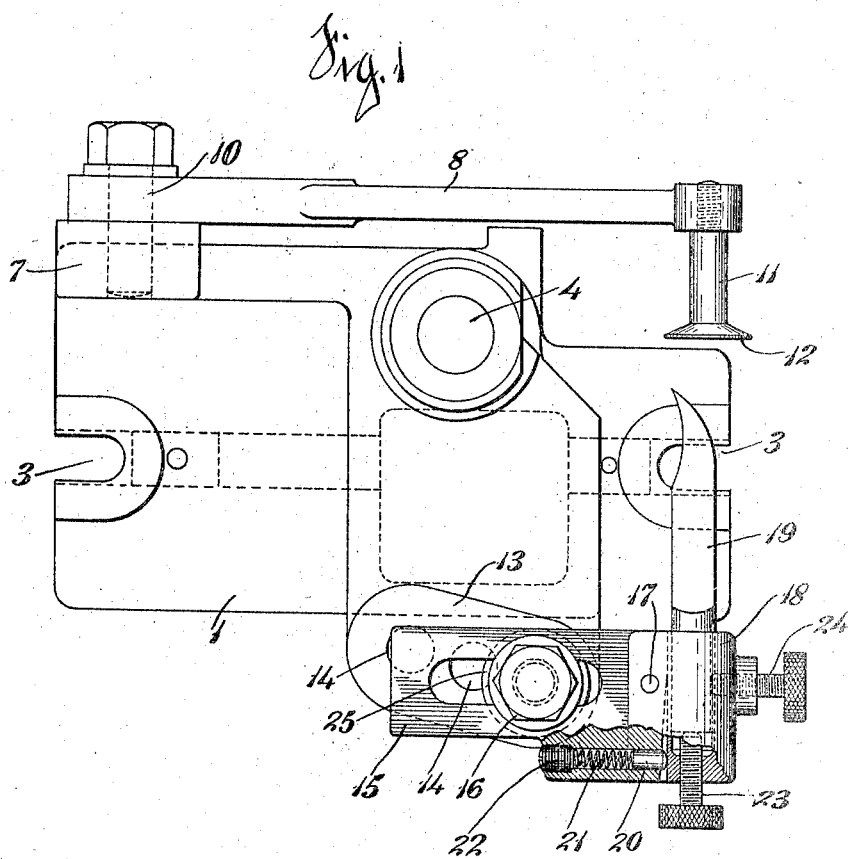
Figure 1 is a plan view of an attachment for grinding machines embodying my invention.

The numeral 1 indicates the base of an attachment to be secured to the table of a grinding machine. Guide lugs 2 arranged to fit into the T-slot of said table, are secured to the bottom of said base as shown, and the attachment is secured against longitudinal movement in the slot by means of bolts in the slots 3 of the base in the ordinary manner. Mounted in the base 1 is a post 4, the upper end of said post being arranged to receive a bushing 5 upon which the gear cutter to be sharpened is mounted, a collar 6 on the post being interposed between the bushing and the upper surface of the base. A standard 7 is provided on the base. The upper portion of said standard is provided with a threaded perforation for the attachment of an arm 8, the said arm being provided with a slot 9 through which a bolt 10 passes to secure the arm to the standard 7, the slot permitting longitudinal and rotary movements of the arm. The free end of said arm has secured thereto, a rod 11, on the free end of which is a guide surface 12 disposed in a plane, axial and radial with reference to the post 4.

The base 1 is provided with an extension having a boss 13, the upper surface of which is flat. Perforations 14 are provided in said extension. A slotted pawl arm 15 is arranged to be secured by means of a bolt 16 passing through the slot thereof, and through either of the perforations 14, to the extension of the base. Pivotally mounted on one end of the pawl arm 15 is a head 18, one edge of the said head being rabbeted to engage the end of the pawl arm, to provide flanges for such pivotal connection. The base of the rabbet in said head is so arranged, relatively to the end of the pawl arm, as to allow a limited movement about the pivotal mounting 17. A pawl 19 is adjustably mounted in a bore in said head. Arranged to bear against one end of the head 18 is a pin 20 slidably mounted in the pawl arm; a spring 21 compressed by a screw 22 bears against the pin 20 thrusting it outwardly against the head 18. An adjusting screw 23 in the head 18 bears against the end of the pawl 19, and when screwed inwardly, thrusts the said pawl forward for longitudinal adjustment. A screw 24 in the head 19 secures the desired adjustment when obtained. A spacing collar 25 interposed between the pawl arm and the upper surface of the boss 13, provides play for the head 18 in making necessary adjustments.

In the use of my invention, the grinding wheel is adjusted so that the cutting plane thereof coincides with the guide surface 12 on the arm 8. The cutter is also adjusted by placing one of its teeth against said surface. The point of the pawl 19 is then brought to bear against the base of such tooth. In accomplishing this, large adjustments of the pawl are effected by positioning the pawl arm 15 upon the boss 13, the perforations 14 and the slot in the pawl arm permitting a broad range of adjustment of the pawl arm, the bolt being secured in either of the perforations to increase or diminish the distance of the arm from the gear cutter, and the slot in the pawl arm providing for longitudinal and pivotal adjustments of the arm relative to the base. The finer adjustments are effected by means of the adjusting screw 23, which operates the pawl 19, causing it to occupy the desired position. When such adjustments have been effected, the arm 8 is rotated about the bolt 10 to the position partially shown by broken lines in Fig. 2 where it is out of the way. The face of the tooth is then ground in the ordinary manner and the gear rotated on the post 4 to bring the next tooth into grinding position, that is, where the base of such tooth rests upon the point of the pawl 19, the pawl springing outwardly during such rotation against the pressure of the spring 21 and regaining its normal position by reason of such spring when the tooth is in position.

The teeth of the gear cutter are thus ground in succession and the grinding of each tooth is necessarily in an axial plane radially disposed. Should further cuts be necessary to complete the sharpening of the teeth, the pawl 19 is suitably adjusted by means of the adjusting screw 23 to provide for small additional cuts of the cutter teeth. The adjustments of the pawl by means of the screw 23, as will readily be seen, may be exceedingly minute and accurate, and the pawl may thus be accurately set for the further grinding of the teeth in axial planes radially disposed as above set forth. If desired, the screw 23 may be provided with a scale for determining the depth of successive operations.

Having thus described my invention, what I claim as new and desire to secure by Letters Patent is:

1. A device of the character described, comprising a base adapted to be secured to a grinding machine, a post on said base arranged to support a cutter, a pawl arm adjustably mounted on said base, a head pivotally mounted on said arm, a compression member interposed between one end of said head and said pawl arm, and a pawl adjustably mounted in the other end of said head.

2. A device of the character described, comprising a base adapted to be secured to a grinding machine, a post on said base arranged to support a cutter, a member mounted on said base whereby the grinding wheel of said machine may be adjusted to a plane axial and radial with reference to said post, a pawl arm adjustably mounted on said base, a head pivotally mounted on said arm, a compression member interposed between one end of said head and said pawl arm, and a pawl adjustably mounted in the other end of said head.

3. A device of the character described, comprising a base adapted to be secured to a grinding machine, a post on said base arranged to support a cutter, a pawl arm adjustably mounted on said base, a pawl mounted in a bore on said arm, and means bearing against the end of said pawl for adjusting said pawl longitudinally in said bore.

4. A device of the character described, comprising a base adapted to be secured to a grinding machine, a post on said base arranged to support a cutter, a member mounted on said base whereby the grinding wheel of said machine may be adjusted to a plane axial and radial with reference to said post, a pawl arm adjustably mounted on said base, a pawl mounted in a bore on said arm, and means bearing against the end of said pawl for adjusting said pawl longitudinally in said bore.

5. A device of the character described, comprising a base adapted to be secured to a grinding machine, a post on said base arranged to support a cutter, a pawl arm adjustably mounted on said base, a head pivotally mounted on said arm, a compression member interposed between one end of said head and said pawl arm, a pawl mounted in a bore in the other end of said head, and means for adjusting said pawl longitudinally in said bore.

6. A device of the character described, comprising a base adapted to be secured to a grinding machine, a post on said base arranged to support a cutter, a member mounted on said base whereby the grinding wheel of said machine may be adjusted to a plane axial and radial with reference to said post, a pawl arm adjustably mounted on said base, a head pivotally mounted on said arm, a compression member interposed between one end of said head and said pawl arm, a pawl mounted in a bore in the other end of said head, and means for adjusting said pawl longitudinally in said bore.

HERMAN R. ISLER.

Copies of this patent may be obtained for five cents each, by addressing the "Commissioner of Patents, Washington, D. C."